A. B. CADMAN.
AUTOMOBILE TRAILER COUPLING.
APPLICATION FILED DEC. 11, 1916.
Reissued Jan. 7, 1919.
14,582.
2 SHEETS—SHEET 1.
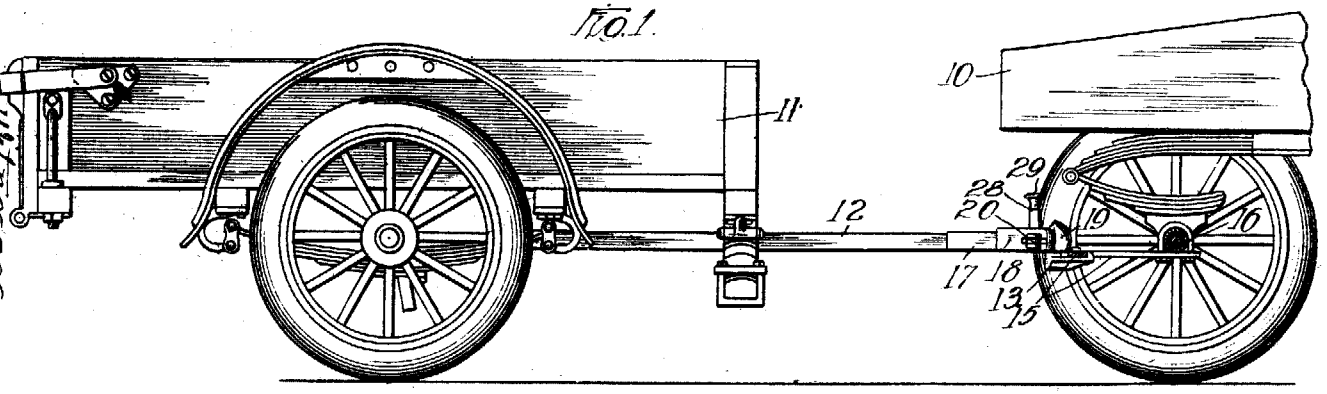
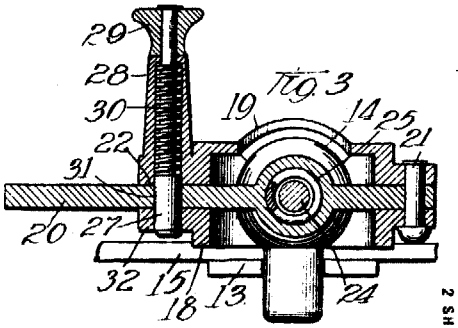
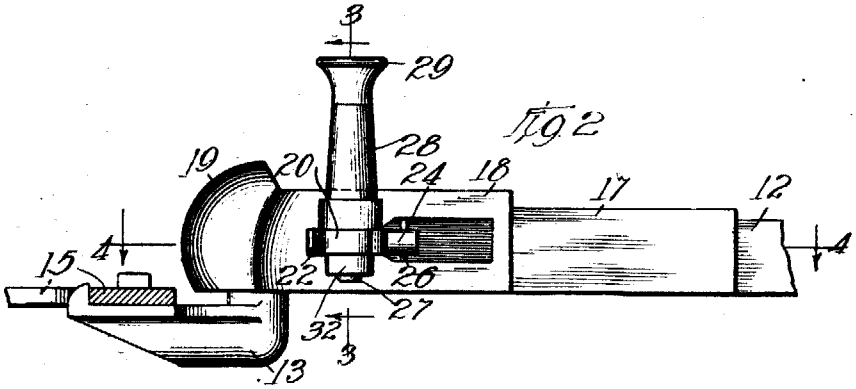
Witnesses
Harry R. Lewis
W. P. Kilroy
Inventor
Addi Benjamin Cadman
By Miller Chindahl & Parker
Attys.

A. B. CADMAN.

AUTOMOBILE TRAILER COUPLING.

APPLICATION FILED DEC. 11, 1916

Reissued Jan. 7, 1919.

14,582.

2 SHEETS-SHEET 2.

Witnesses:
Harry R. Lewis
W. P. Kilroy

Inventor:
Addi Benjamin Cadman
By Miller Chindahl Parker
Attys.

UNITED STATES PATENT OFFICE.

ADDI BENJAMIN CADMAN, OF BELOIT, WISCONSIN, ASSIGNOR, BY MESNE ASSIGNMENTS, TO WARNER MANUFACTURING COMPANY, OF SOUTH BELOIT, ILLINOIS, A CORPORATION OF WISCONSIN.

AUTOMOBILE-TRAILER COUPLING.

14,582. Specification of Reissued Letters Patent. Reissued Jan. 7, 1919.

Original No. 1,201,232, dated October 10, 1916, Serial No. 80,581, filed February 26, 1916. Application for reissue filed December 11, 1916. Serial No. 137,240.

*To all whom it may concern:*

Be it known that I, ADDI BENJAMIN CADMAN, a citizen of the United States, residing at Beloit, in the county of Rock and State of Wisconsin, have invented certain new and useful Improvements in Automobile-Trailer Couplings, of which the following is a specification.

The object of this invention is to produce an improved coupling which is especially adapted for disengageably connecting a trailer cart to an automobile; and the invention aims to provide a ball-and-socket coupling which affords a strong and durable connection between the two vehicles allowing relative movement in all directions; which is very convenient to operate in coupling and uncoupling the trailer cart; and in which the sections are positively locked together and at the same time are yieldably held so as to prevent loose play or rattling.

Figure 4:
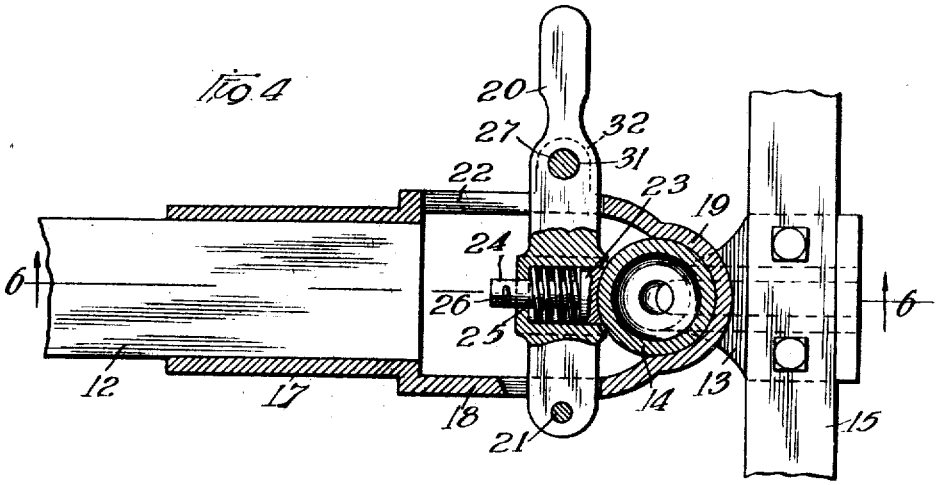
Figure 5:
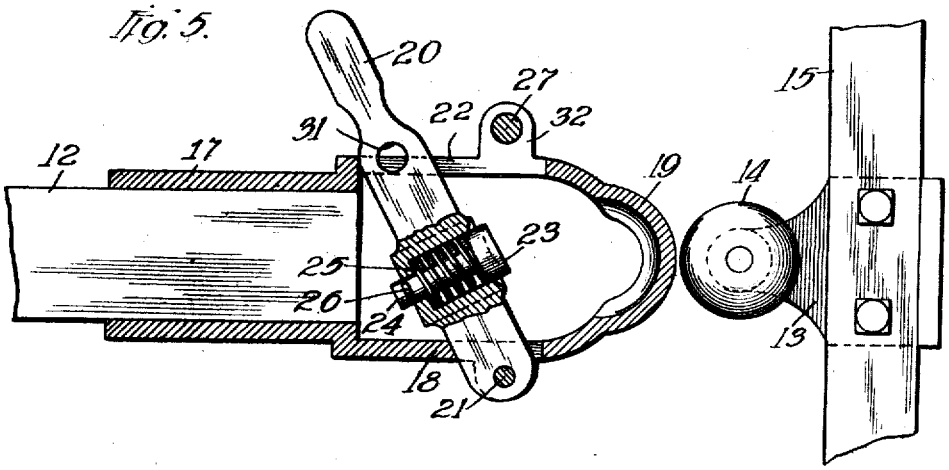
Figure 6:
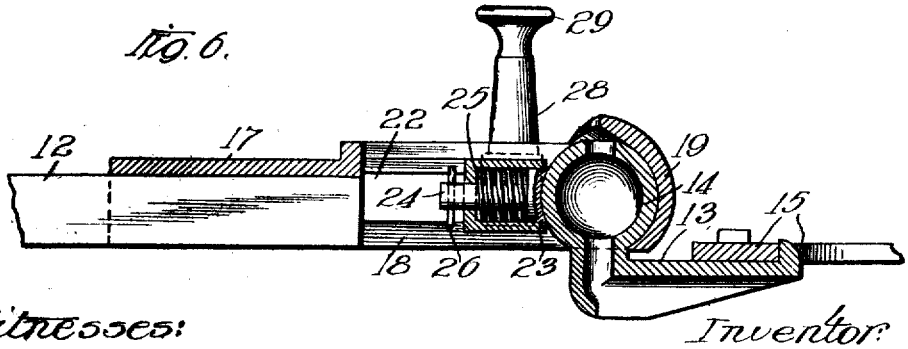

In the accompanying drawings, Figure 1 is a view in side elevation showing a trailer coupled to an automobile by means of a coupling embodying my invention, parts of the automobile being sectioned away to better illustrate the coupling. Fig. 2 is an elevational view of the coupling looking at the side opposite from that shown in Fig. 1. Fig. 3 is a transverse section of the coupling in the plane of line 3—3 of Fig. 2. Fig. 4 is a horizontal section in the plane of line 4—4 of Fig. 2. Fig. 5 is a section in the same plane as Fig. 4, but showing the parts of the coupling disassociated from each other. Fig. 6 is a longitudinal vertical section in the plane of line 6—6 of Fig. 4.

Referring to Fig. 1, the rear portion of an automobile is indicated by reference numeral 10 and a trailer cart by numeral 11, the cart having a tongue 12.

The coupling comprises a ball portion and a socket portion which are preferably attached respectively to the automobile and the trailer, although this arrangement might be reversed. The ball portion comprises, in the present instance, a base or attaching portion 13 and a spherical ball 14 projecting upwardly therefrom. The base 13 may be secured to the automobile in any suitable way as by means of a U-shaped bar or yoke 15 having its ends secured by clamping means 16 to the rear axle of the automobile, the base member 13 being rigidly fixed to the midportion of said yoke.

The socket member in its preferred form comprises an attaching portion 17 adapted to be fixed upon the forward end of the tongue 12 and having at its forward end an open frame 18 terminating in a concave socket 19 adapted to receive the ball 14.

The ball is arranged to be securely held in the socket in a manner permitting free relative movement of the two coupling sections in all directions, while at the same time preventing any loose play or rattle between said sections. The means for thus securing the ball comprises a lever 20 pivoted at one end at 21 to one side of the open frame 18, said lever extending horizontally across the frame and passing through a slot 22 in the opposite side thereof. Between its ends the lever carries a spring-pressed member which is preferably in the form of a plunger 23 slidable in a bore in the lever, and having a stem 24 passing through an opening at one end of said bore. A coiled compression spring 25 surrounds said stem and tends to force the plunger outwardly to the limit allowed by a stop pin 26 in the stem. Preferably the outer end of the plunger head has a concave recess therein and the surrounding portion of the lever may be similarly shaped so as to conform to the surface of the ball 14.

The lever is arranged to be secured in operative position to hold the ball in the socket by latch means which in the preferred form comprises a spring-pressed plunger 27 (Fig. 3) slidably mounted in a vertically disposed barrel 28 which may be integral with one side of the frame 18, the plunger having a head 29 fixed on its upper end forming a finger-piece for lifting the plunger. A coiled spring 30 surrounding the plunger within the barrel 28 tends to press the plunger down to the limit allowed by the head 29, the lower end of the plunger being arranged to pass through an opening 31 (Fig. 5) in the lever 20 and enter an opening in a lug 32 on the frame. The barrel 28 and lug 32 are located respectively above and below the slot 22 in the frame so that the lever may be moved into and out of position between said barrel and lug.

Assuming the parts to be in the position shown in Figs. 1, 2 and 4, when it is desired to disconnect the trailer from the automobile, the operator grasps the head 29 of the plunger 27 and lifts the plunger out of engagement with the lever 20 when said lever may be swung rearwardly to the position shown in Fig. 5. The tongue 12 of the trailer may then be lifted to disengage the socket from the ball 14.

In some of the prior couplings of this character, a ball-retaining member has been held in its retaining position by spring pressure only. My coupling is superior to such a construction, for the reason that the lever 20 is positively locked by the plunger detent 27 in the position to prevent escape of the ball from the socket, while at the same time the spring-pressed plunger 23, which is mounted on the lever for independent movement, acts to yieldingly engage the ball to prevent loose play or rattling of the parts.

While I have herein described in detail the preferred embodiment of my invention, it should be understood that I do not intend to limit the same to the exact structure disclosed, inasmuch as various modifications may be made therein without departing from its essential characteristics. The scope of the invention is pointed out in the appended claims.

I claim as my invention:

1. An automobile trailer coupling comprising a socket portion adapted to be rigidly secured to one vehicle, a ball portion adapted to be mounted on another vehicle, said ball portion comprising an attaching base and a ball proper projecting upwardly therefrom, the socket portion comprising an open frame adapted to receive the ball through its lower end and having a socket proper at one end of the frame to fit the ball, a lever pivoted at one end to one side of said frame and extending horizontally across the frame adjacent to said socket and passing through a slot in the opposite side of the frame, a spring-pressed member carried by said lever between its ends and arranged to bear against the ball to hold it snugly in its socket, and a spring-pressed latch mounted on one side of the frame and arranged to engage said lever for holding the latter in its operative position.

2. An automobile trailer coupling comprising a socket portion adapted to be mounted on one vehicle, a ball portion including an upstanding ball proper adapted to be mounted on another vehicle, said socket portion comprising an open frame having a socket proper in one end, the frame being adapted to have the ball pass upwardly through its lower end, a lever mounted in the frame adjacent to said socket and carrying yieldable means to engage the ball and hold it snugly in its socket, and disengageable means for rigidly holding said lever in its operative position.

3. A vehicle coupling comprising a socket portion and a ball portion adapted to be mounted on two vehicles, respectively, said socket portion having a socket proper at one end and having an open lower side to permit the ball to pass into and out of said socket, a movably-mounted ball-retaining device carried by the socket portion opposite to the socket proper and comprising a ball-engaging portion which is yieldable with relation to the remainder of the device, said device being adapted to prevent accidental disengagement of the ball from the socket, and means for positively locking said device in its ball-retaining position.

4. A vehicle coupling comprising a ball portion, a socket portion, a lever pivoted at one end on the socket portion, a spring-pressed member carried by said lever and arranged to engage the ball, and spring-pressed latch means arranged to rigidly hold the lever in position to prevent escape of the ball from the socket.

5. A vehicle coupling comprising a ball member having an attaching portion and a ball proper projecting upwardly therefrom, a socket portion having a socket proper at one end and having an open lower side to permit the ball to be passed into and out of association with the socket proper, a ball-retaining member movably mounted on the socket portion opposite to the socket proper, a spring-pressed plunger carried by said member and adapted to engage the ball, and means for positively locking said member to the socket to prevent escape of the ball.

6. A vehicle coupling comprising a ball and a socket arranged to be freely associated and disassociated, a lever pivoted on the socket, means for rigidly holding the lever in operative position, and spring-pressed means mounted for independent movement on the lever and arranged to directly engage the ball.

7. A vehicle coupling comprising a ball and a socket arranged to be readily associated and disassociated, a member movably mounted on the socket for holding the ball in place, means for rigidly holding said member in operative position, and spring-pressed means mounted for independent movement on said member and arranged to directly engage the ball to prevent rattling.

8. A coupler of the character described comprising, in combination, an upstanding ball, a socket portion open in its lower side to admit said ball and having a socket proper in its forward end to fit the ball, said socket portion having slots in its side walls behind the ball, a ball-retainer mounted in said slots for movement forward and back in a horizontal plane into and out of position to retain the ball in the socket, and means for locking said retainer in its forward or ball-retaining position.

9. A vehicle coupler comprising a ball and a socket arranged to be readily associated and disassociated, a member mounted on the socket for holding the ball in place and being movable into position to permit entrance and withdrawal of the ball, releasable means for positively holding said member in its ball-retaining position, and spring means associated with said member and exerting its force in a front to rear direction parallel to the line of draft through the coupler, said spring means operating while the member is thus positively held to exert constant pressure on the ball to prevent rattling.

10. A coupler of the character described having, in combination, a ball and a socket arranged to be readily associated and disassociated, a ball-retainer mounted on the socket in position to engage the ball and arranged to be movable back and forth in a horizontal plane parallel to the line of draft through the coupler for permitting the association and disassociation of the ball and socket, and means for locking said ball-retainer to the socket in position to prevent escape of the ball therefrom.

11. A coupling of the character described having, in combination, a ball and a socket adapted to be readily associated and disassociated, and a two-part ball-retainer movably mounted on the socket and comprising a main body portion and a portion which is yieldably mounted on the said main body portion and is arranged to directly engage the ball.

12. A coupler of the character described comprising, in combination, a ball mounted on a vertically disposed axis, a socket open at one side to receive the ball and having a socket proper in one end to fit the ball, a ball-retainer movably mounted on the socket behind the ball, said ball-retainer having a bore therein, a plunger slidably mounted in said bore in a front to rear direction along the line of draft through the coupler, and a coiled spring in said bore acting upon said plunger, said spring being arranged to effect yielding pressure against the ball, and means for locking said retainer in its ball-retaining position while permitting said spring and plunger to function.

13. A coupler of the character described comprising, in combination, an upstanding ball, a socket open at one side to receive the ball and having a socket proper in one end to fit the ball, a ball retainer movably mounted on the socket behind the ball, said ball retainer having a bore therein, a plunger slidably mounted in said bore in a front-to-rear direction along the line of draft through the coupler, means for moving said plunger to take up wear or lost motion of the parts, and means for locking said retainer in position to prevent escape of the ball.

14. A coupler of the character described comprising, in combination, an upstanding ball, a socket portion open at one side to receive the ball and having a socket proper in its forward end to fit the ball, a two-part ball retainer movably mounted on the socket portion behind the ball, one of said parts being arranged to engage the ball, and the parts being movable with respect to each other to take up wear or lost motion in the coupler, and means for locking the retainer to the socket in position to prevent escape of the ball.

In testimony whereof I have hereunto set my hand.

ADDI BENJAMIN CADMAN.

Correction in Letters Patent Reissue No. 14,582.

It is hereby certified that in Letters Patent reissue No. 14,582, granted January 7, 1919, upon the application of Addi Benjamin Cadman, of Beloit, Wisconsin, for an improvement in "Automobile-Trailer Couplings," errors appear in the grant requiring correction as follows: Line 7, for the words "said assignee" read *Warner Manufacturing Company, a corporation of Illinois;* and in the granting clause, after the word "Company" insert the words *a corporation of Wisconsin;* and that the said Letters Patent should be read with these corrections therein that the same may conform to the record of the case in the Patent Office.

Signed and sealed this 25th day of February, A. D., 1919

[SEAL.

F. W H CLAY,

*Acting Commissioner of Patents.*

Cl. 213—67.